United States Patent [19]

Auxier et al.

[11] Patent Number: 4,664,597
[45] Date of Patent: May 12, 1987

[54] COOLANT PASSAGES WITH FULL COVERAGE FILM COOLING SLOT

[75] Inventors: Thomas A. Auxier, Lake Park; Leon R. Anderson; Edward C. Hill, Jr., both of Tequesta, all of Fla.

[73] Assignee: United Technologies Corporation, Hartford, Conn.

[21] Appl. No.: 812,103

[22] Filed: Dec. 23, 1985

[51] Int. Cl.[4] .................................................. F01D 5/18
[52] U.S. Cl. ...................................... 416/97 R; 415/115
[58] Field of Search ................... 416/97 R, 97 A; 415/115; 60/757

[56] References Cited

U.S. PATENT DOCUMENTS

| | | | |
|---|---|---|---|
| 1,857,509 | 5/1932 | Holmstrom . | |
| 2,149,510 | 3/1939 | Darrieus | 60/41 |
| 2,220,420 | 11/1940 | Meyer | 60/41 |
| 2,236,426 | 3/1941 | Faber | 60/41 |
| 2,477,583 | 8/1949 | De Zubay et al. | 60/44 |
| 2,489,683 | 11/1949 | Stalker | 60/41 |
| 3,098,148 | 7/1963 | Piot et al. | 219/69 |
| 3,303,645 | 2/1967 | Ishibashi | 60/39.65 |
| 3,447,318 | 6/1969 | Carvel et al. | 60/39.65 |
| 3,515,499 | 6/1970 | Beer et al. | 416/95 |
| 3,527,543 | 9/1970 | Howald | 416/90 |
| 3,594,536 | 7/1971 | Holroyd | 219/69 |
| 3,619,076 | 11/1971 | Kydd | 416/90 |
| 3,635,586 | 1/1972 | Keat et al. | 416/97 |
| 3,746,827 | 7/1973 | Martin et al. | 219/69 |
| 3,778,183 | 12/1973 | Luscher et al. | 415/115 |
| 3,799,696 | 3/1974 | Redman | 416/97 |
| 3,801,218 | 4/1974 | Moore | 416/97 A |
| 3,830,450 | 8/1974 | Williams et al. | 244/42 |
| 3,844,677 | 10/1974 | Evans | 416/84 |
| 3,889,903 | 6/1975 | Hilby | 244/42 |
| 3,915,106 | 10/1975 | De Witt | 114/66.5 |
| 3,995,422 | 12/1976 | Stamm | 60/39.66 |
| 4,142,824 | 3/1979 | Andersen | 415/115 |
| 4,162,136 | 7/1979 | Parkes | 416/97 |
| 4,168,938 | 9/1979 | Dodd | 416/97 |
| 4,197,443 | 4/1980 | Sidenstick | 219/69 |
| 4,214,722 | 7/1980 | Tamura | 244/208 |
| 4,229,140 | 10/1980 | Scott | 416/97 R |
| 4,267,698 | 5/1981 | Hartmann et al. | 60/756 |
| 4,303,374 | 12/1981 | Braddy | 416/97 R |
| 4,314,442 | 2/1982 | Rice | 415/115 X |
| 4,384,823 | 5/1983 | Graham | 416/1 |
| 4,565,490 | 1/1986 | Rice | 415/115 X |

FOREIGN PATENT DOCUMENTS

| | | |
|---|---|---|
| 55-114806 | 5/1980 | Japan . |
| 665155 | 1/1952 | United Kingdom . |
| 2066372 | 7/1981 | United Kingdom ............. 416/97 A |

OTHER PUBLICATIONS

Flight and Aircraft Engineer, No. 2460, vol. 69, 3-1-6-56, pp. 292-295.
Advances in Heat Transfer by Richard J. Goldstein, vol. 7, Academic Press (N.Y. 1971), the Monograph Film Cooling, pp. 321-379.
NASA Technical Paper 1546 Influence of Coolant Tube Curvature on Film Cooling Effectiveness as Detected by Infrared Imagery by S. Stephen Papell et al., 1979.

Primary Examiner—Everette A. Powell, Jr.
Attorney, Agent, or Firm—Stephen E. Revis

[57] ABSTRACT

The wall of a hollow airfoil has a longitudinally extending slot in its external surface which is intersected, at its base, by a plurality of coolant passages in a longitudinally extending row. Each coolant passage has a metering portion at its inner end which communicates with a coolant compartment within the hollow airfoil. Each passage includes a pair of walls downstream of the metering portion which diverge from each other in the longitudinal direction and intersect with the base of the slot to form an outlet for the passage. The diverging walls of adjacent passages substantially meet each other at the base of the slot, wherein coolant fluid from the metering portions of the passages diffuses in the longitudinal direction as it flows toward and into the slot, filling the entire slot and forming a thin, continuous film of coolant downstream of and along the entire length of the slot over the external surface of the airfoil.

9 Claims, 10 Drawing Figures

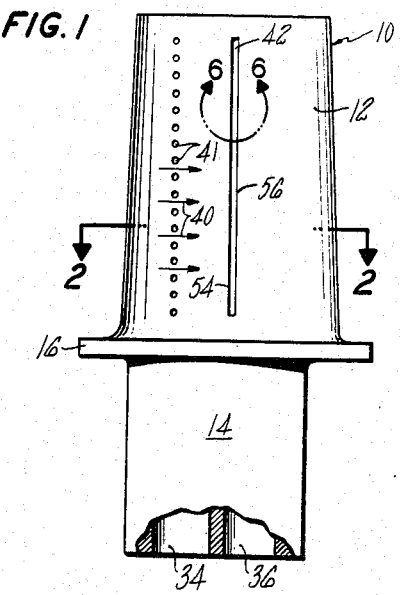
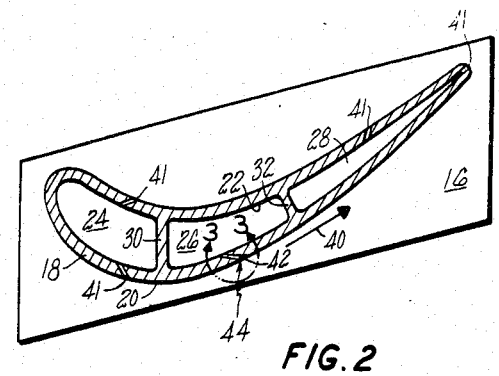
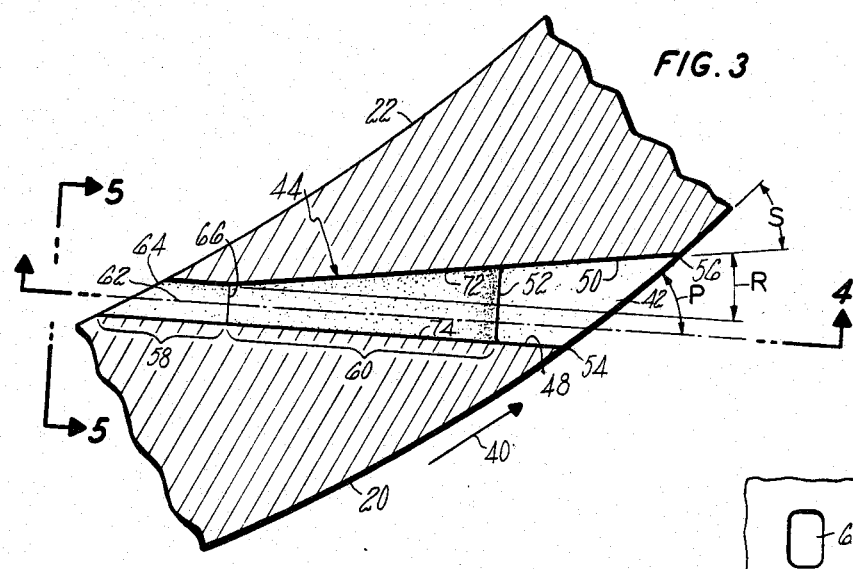

FIG. 9 PRIOR ART
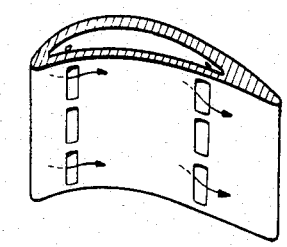
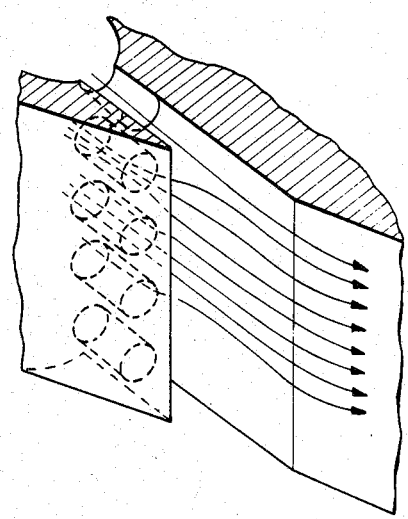
FIG. 10 PRIOR ART

COOLANT PASSAGES WITH FULL COVERAGE FILM COOLING SLOT

The Government has rights in this invention pursuant to Contract No. F33657-82-C-0122 awarded by the Department of the Air Force.

TECHNICAL FIELD

This invention relates to film cooling, and more particularly to film-cooled airfoils.

BACKGROUND ART

It is well known the external surface of airfoils may be cooled by conducting cooling air from an internal cavity to the external surface via a plurality of small passages. It is desired that the air exiting the passages remain entrained in the boundary layer on the surface of the airfoil for as long a distance as possible downstream of the passage to provide a protective film of cool air between the hot mainstream gas and the airfoil surface. The angle which the axis of the passage makes with the airfoil surface and its relation to the direction of hot gas flow over the airfoil surface at the passage breakout are important factors which influence film cooling effectiveness. Film cooling effectiveness E is defined as the difference between the temperature of the main gas stream ($T_g$) and the temperature of the coolant film ($T_f$) at a distance X downstream of the passage outlet, divided by the temperature difference between the temperature of the main gas stream and the coolant temperature ($T_c$) at the passage outlet (i.e., at x=0) thus, $E=(T_g-T_f)/(T_g-T_c)$. Film cooling effectiveness decreases rapidly with distance x from the passage outlet. Maintaining high film cooling effectiveness for as long a distance as possible over as large a surface area as possible is the main goal of airfoil film cooling.

It is well known in the art, that the engine airfoils must be cooled using a minimum amount of cooling air, since the cooling air is working fluid which has been extracted from the compressor and its loss from the gas flow path rapidly reduces engine efficiency. Airfoil designers are faced with the problem of cooling all the engine airfoils using a specified, maximum cooling fluid flow rate. The amount of fluid which flows through each individual cooling passage from an internal cavity into the gas path is controlled by the minimum cross-sectional area (metering area) of the cooling passage. The metering area is typically located where the passage intersects the internal cavity. The total of the metering areas for all the cooling passages and orifices leading from the airfoil controls the total flow rate of coolant from the airfoil, assuming internal and external pressure fields are predetermined and generally not controllable by the designer. The designer has the job of specifying the passage size and the spacing between passages, as well as the shape and orientation of the passages, such that all areas of the airfoil are maintained below critical design temperature limits determined by the airfoil material capability, maximum stress, and life requirement considerations.

Ideally, it is desired to bathe 100% of the airfoil surface with a film of cooling air; however, the air leaving the passage exit generally forms a cooling film stripe no wider than or hardly wider than the dimension of the passage exit perpendicular to the gas flow. Limitations on the number, size, and spacing of cooling passages results in gaps in the protective film and/or areas of low film cooling effectiveness which may produce localized hot spots. Airfoil hot spots are one factor which limits the operating temperature of the engine.

U.S. Pat. No. 3,527,543 to Howald uses divergently tapered passages of circular cross section to increase the entrainment of coolant in the boundary layer from a given passage. The passages are also preferably oriented in a plane extending in the longitudinal direction or partially toward the gas flow direction to spread the coolant longitudinally upon its exit from the passage as it moves downstream. Despite these features, it has been determined by smoke flow visualization tests and engine hardware inspection that the longitudinal width of the coolant film from an elliptical passage breakout (i.e. Howald) continues to expand longitudinally only about a maximum of one passage exit minor diameter after the coolant is ejected on the airfoil surface. This fact, coupled with typical longitudinal spacing of three to six diameters between passages, result in areas of airfoil surface between and downstream of longitudinally spaced passages which receive no cooling fluid from that row of passages. Conical, angled passages as described in Howald U.S. Pat. No. 3,527,543 provide at best probably no more than 70% coverage (percentage of the distance between the centers of adjacent hole breakouts which is covered by coolant).

The velocity of the air leaving the cooling passage is dependent on the ratio of its pressure at the passage inlet to the pressure of the gas stream at the passage outlet. In general the higher the pressure ratio, the higher the exit velocity. Too high an exit velocity results in the cooling air penetrating into the gas stream and being carried away without providing effective film cooling. Too low a pressure ratio will result in gas stream ingestion into the cooling passage causing a complete loss of local airfoil cooling. Total loss of airfoil cooling usually has disastrous results, and because of this a margin of safety is usually maintained. This extra pressure for the safety margin drives the design toward the higher pressure ratios. Tolerance of high pressure ratios is a desirable feature of film cooling designs. Diffusion of the cooling air flow by tapering the passage, as in the Howald patent discussed above is beneficial in providing this tolerance, but the narrow diffusion angles taught therein (12° maximum included angle) require long passages and, therefore, thick airfoil walls to obtain the reductions in exit velocities often deemed most desirable to reduce the sensitivity of the film cooling design to pressure ratio. The same limitation exists with respect to the trapezoidally shaped diffusion passages described in Sidenstick, U.S. Pat. No. 4,197,443. The maximum included diffusion angles taught therein in two mutually perpendicular planes are 7° and 14°, respectively, in order to assure that separation of the cooling fluid from the tapered walls does not occur and the cooling fluid entirely fills the passage as it exits into the hot gas stream. With such limits on the diffusing angles, only thicker airfoil walls and angling of the passages in the airfoil spanwise direction can produce wider passage outlets and smaller gaps between passages in the longitudinal direction. Wide diffusion angles would be preferred instead, but cannot be achieved using prior art teachings.

Japanese Patent No. 55-114806 shows, in its FIGS. 2 and 3 (reproduced herein as prior art FIGS. 9 and 10), a hollow airfoil having straight cylindrical passages disposed in a longitudinal row and emptying into a longitudinally extending slot formed in the external surface of the airfoil. While that patent appears to teach that the flow of cooling fluid from adjacent passages blends to form a film of cooling fluid of uniform thickness over the full length of the slot by the time the cooling fluid exits the slot and reaches the airfoil surface, our test experience indicates that the coolant fluid from the cylindrical passages moves downstream as a stripe of essentially constant width, which is substantially the diameter of the passage. Any diffusion which results in blending of adjacent stripes of coolant fluid occurs so far downstream that film cooling effectiveness at that point is well below what is required for most airfoil designs.

U.S. Pat. No. 3,515,499 to Beer et al describes an airfoil made from a stack of etched wafers. The finished airfoil includes several areas having a plurality of longitudinally spaced apart passages leading from an internal cavity to a common, longitudinally extending slot from which the cooling air is said to issue to form a film of cooling air over the airfoil external surface. In FIG. 1 thereof each passage appears to converge from its inlet to a minimum cross-sectional area where it intersects the slot. In the alternate embodiment of FIG. 9, the passage appears to have a small, constant size which exits into a considerably wider slot. Both configurations are likely to have the same drawbacks as discussed with respect to the Japanese patent; that is, the cooling fluid will not uniformly fill the slot before it enters the main gas stream, and considerably less than 100% film coverage downstream of the slot is likely.

Other publications relating to film cooling the external surface of an airfoil are: U.S. Pat. Nos. 2,149,510; 2,220,420; 2,489,683; and "Flight and Aircraft Engineer" No. 2460, Vol. 69, 3/16/56, pp. 292-295, all of which show the use of longitudinally extending slots for cooling either the leading edge or pressure and suction side airfoil surfaces. The slots shown therein extend completely through the airfoil wall to communicate directly with an internal cavity. Such slots are undesireable from a structural strength viewpoint; and they also require exceedingly large flow rates.

U.S. Pat. No. 4,303,374 shows a configuration for cooling the exposed, cut-back surface of the trailing edge of an airfoil. The configuration includes a plurality of longitudinally spaced apart, diverging passages within the trailing edge. Adjacent passages meet at their outlet ends to form a continuous film of cooling air over the cut-back surface.

A serial publication, "Advances in Heat Transfer" edited by T. F. Irvine, Jr. and J. P. Hartnett, Vol. 7, Academic Press (N.Y. 1971) includes a monograph titled *Film Cooling*, by Richard J. Goldstein, at pp. 321-379, which presents a survey of the art of film cooling. The survey shows elongated slots of different shapes extending entirely through the wall being cooled, and also passages of circular cross section extending through the wall.

DISCLOSURE OF INVENTION

One object of the present invention is a hollow airfoil having improved film cooling of its external surface.

Another object of the present invention is a film coolant configuration for the wall of a hollow airfoil which reduces the possibility of blockage of individual coolant passages.

Yet another object of the present invention is a cooling configuration for the wall of a hollow airfoil which produces a longitudinally extending continuous film of coolant over the external surface of the airfoil.

According to the present invention, the wall of a hollow airfoil has a longitudinally extending slot in its external surface and a longitudinal row of coolant passages therethrough which each have a metering portion at their inner ends and a diffusing portion at their outer ends, wherein the wall surfaces of the diffusing portion diverge in the longitudinal direction toward the airfoil outer surface, the diverging wall surfaces of adjacent passages substantially meeting each other at the base of the slot below the airfoil outer surface, whereby the passages empty into and fill the slot with coolant which leaves the slot as a continuous longitudinally extending film over the airfoil external surface downstream of the slot.

The passages and the slot surfaces are angled to direct coolant therefrom with a component of velocity in the downstream direction and at a shallow angle with respect to the external surface such that, upon leaving the slot, the coolant stays attached to the external surface of the airfoil as a thin film within the boundary layer. By using coolant passages which diverge in the longitudinal direction, and by placing the passages close enough together in a longitudinal row such that there is only a small or no space between adjacent passage outlets where they intersect the base of the slot, results in the coolant further diffusing within and completely filling the longitudinal extent of the slot before entering the hot gas stream. With this construction a small amount of coolant can be spread as a continuous sheet over substantially the full longitudinal extent of the airfoil.

A further advantage of the present invention is that debris in the gas path is less likely to be able to block the flow through an individual coolant passage. If the coolant passage broke out at the external surface of the airfoil as a small, separate outlet, the debris could lodge in that outlet and block the passage. With the present invention the debris is likely to become lodged between the sidewalls of the slot without blocking an individual passage outlet (i.e., the coolant can flow from the passage around the debris).

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 1 is a hollow turbine blade, partly broken away, which incorporates the features of the present invention.

FIG. 2 is a sectional view taken along the line 2—2 of FIG. 1.

FIG. 3 is an enlarged view of the area 3—3 of FIG. 2.

FIG. 5 is a view taken generally along the line 5—5 of FIG. 3.

FIGS. 9 and 10 are reproductions of FIGS. 2 and 3, respectively, of prior art Japanese Patent No. 55-114806.

BEST MODE FOR CARRYING OUT THE INVENTION

Figure 4:
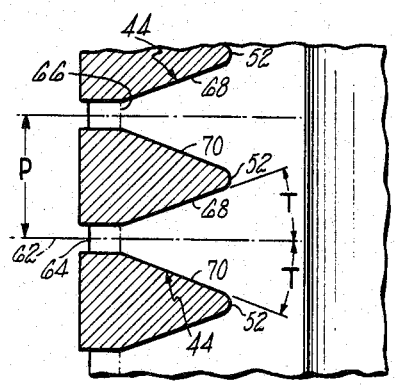
FIG. 4 is a cross-sectional view taken along the line 4—4 of FIG. 3.

As an exemplary embodiment of the present invention, consider the turbine blade of FIG. 1 generally represented by the reference numeral 10. With reference to FIGS. 1 and 2, the blade 10 comprises a hollow airfoil 12 which extends in a spanwise or longitudinal direction from a root 14 which is integral therewith. A platform 16 is disposed at the base of the airfoil 12. The airfoil 12 comprises a wall 18 having an outer surface 20 and an inner surface 22. The inner surface 22 defines a longitudinally extending internal cavity which is divided into a plurality of adjacent longitudinally extending compartments 24, 26, 28 by longitudinally extending ribs 30, 32. A passage 34 within the root 14 communicates with the compartment 24; and a passage 36 within the root 14 communicates with both compartments 26 and 28. When the blade 10 is operated in its intended environment, such as in the turbine section of a gas turbine engine, coolant from a suitable source, such as compressor bleed air, is fed into the passages 34, 36 and pressurizes the compartments 24, 26, and 28.

Throughout the drawing the arrows 40 represent the direction of flow (i.e., streamlines) of hot gases over the surface of the airfoil. For purposes of the description of the present invention, the direction of flow of hot gases over either the pressure or suction side surfaces of the airfoil shall be considered the downstream direction. Thus, at any point on the suction or pressure side surface of the airfoil, the downstream direction is tangent to the surface of the airfoil at that point; and, except perhaps close to the airfoil tip or the airfoil base near the platform where atypical currents are generated, the downstream direction is substantially perpendicular to the spanwise direction of the airfoil.

In accordance with the present invention, the pressurized coolant fluid within the compartments 24, 26, 28 cools the airfoil external wall 18 by exiting the airfoil via passages through the wall 18, such as the passages 41, or via the slot 42 which is fed by passages 44 which will hereinafter be described in further detail. In a typical turbine blade airfoil there may be many rows of passages, such as the passages 41, which passages would be located on both the pressure and suction side of the airfoil and also around the leading edge of the airfoil. For purposes of clarity and simplification, only a few rows of passages are shown in the drawing. Thus, the airfoil in the drawing is intended to be illustrative only and not limiting.

With reference to FIGS. 1-6, in accordance with the present invention the longitudinally extending slot 42 in the external surface 20 of the airfoil comprises a wall surface 48, spaced apart and facing a wall surface 50, the surfaces 48, 50 being joined by a base 52 of the slot. Both the surfaces 48 and 50 are substantially parallel to the longitudinal direction. Hereinafter the surfaces 48, 50 are referred to as forward and rearward surfaces 48, 50, respectively, in view of their position relative to the downstream direction 40. That is, for purposes of this application the surface 50 is downstream of the surface 48 and is therefore considered rearward thereof. The forward surface 48 intersects the external surface 20 to form the upstream edge 54 of the slot 42; while the rearward surface 50 intersects the surface 20 to form the downstream edge 56 of the slot 42. Both the surface 48 and the surface 50 preferably intersect the surface 20 at a shallow angle of less than about 45°.

The passages 44 are substantially aligned in the longitudinal direction along the length of the slot 42. Each passage 44 includes a metering portion 58 at its inner end and a diffusing portion 60 at its outer end in series flow relationship. In this embodiment the metering portion 58 is straight and has a constant generally rectangular metering area in cross-section taken perpendicular to a central axis 62 of the passage 44, which axis passes through the geometric center of the metering area. The metering portion 58 intersects the inner wall 22 to define an inlet 64 to the passage. The metering portion outlet 66 is coincident with the inlet to the diffusing portion 60.

As best seen in FIG. 4, the diffusing portion 60 includes a pair of spaced apart, facing end wall surfaces 68, 70 which diverge in the longitudinal direction from the metering portion outlet 66 to the slot base 52 which such surfaces intersect.

Referring again to FIG. 3, each passage 44 includes a pair of spaced apart, facing side wall surfaces 72, 74 which join the end wall surfaces 68, 70 along their length, and also join with the slot rearward and forward wall surfaces 50, 48, respectively. The side surfaces 72, 74 are substantially parallel to the longitudinal direction. In this embodiment the side surface 74 is coextensive with the slot forward wall surface 48 and is parallel to the central axis 62. Preferably the angle P formed between the central axis 62 and the surface 20 is less than about 45°, most preferably 25°-40°. The side surface 72 is coextensive with the slot rearward wall surface 50 and preferably diverges in the downstream direction from the central axis 62 and from the side wall 74 by an angle herein designated by the letter R. Preferably the angle of divergence R is between about 5° and 10°. Divergence of the rearward surface 50 from the central axis 62 reduces the angle S that the rearward surface 50 makes with the external surface 20 of the airfoil downstream of the slot. This makes it easier for the coolant to become entrained within the boundary layer downstream of the slot. It is contemplated that the angle R may be 0° and still be within the scope of the present invention.

With reference to FIG. 4, the end surfaces 68, 70 each diverge from the central axis 62 by an angle herein designated by the letter T. Thus, the surfaces 68, 70 diverge from each other by an angle of 2T. The spacing or pitch p between adjacent passages 44 and the angle T are selected such that adjacent end surfaces 68, 70 of adjacent passages 44 substantially meet each other at the base 52 of the slot. This maximizes the ability of the coolant to completely fill the slot upon exiting the passages. To minimize the number of passages, it is desirable that the angle T be at least about 10°; however, if the angle T is too large the coolant fluid exiting from the metering portion will not attach to the end surfaces 68, 70. In that case the coolant will not fill the diffusing portion nor diffuse significantly within the slot; and a continuous film of coolant will not be formed along the length of the slot.

Figure 7:
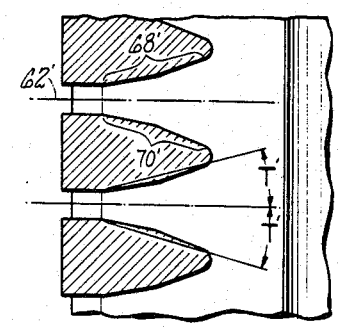
FIG. 7 is a cross-sectional view analogous to FIG. 4 showing an alternate embodiment of the present invention.
Figure 6:
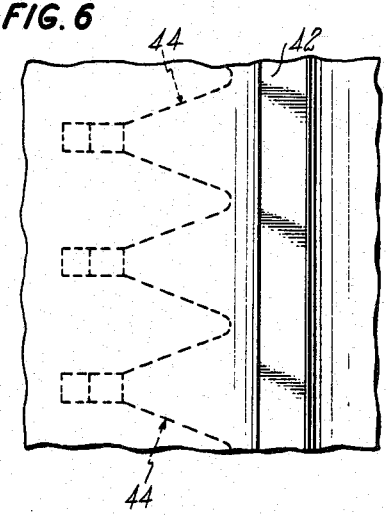
FIG. 6 is an enlarged view of the area 6—6 of FIG. 1.

FIG. 7 is analogous to FIG. 4 but shows an alternate embodiment of the present invention. In FIG. 7 the end wall surfaces 68', 70' diverge from the central axis 62' in two steps to form an effective angle of divergence T', which is the angle that would have been formed had the end surfaces 68', 70' each been a single flat surface extending from the beginning of the surface 68' to the end of the surface 70'. The effective angle of divergence T' should be at least 10°.

Figure 8:
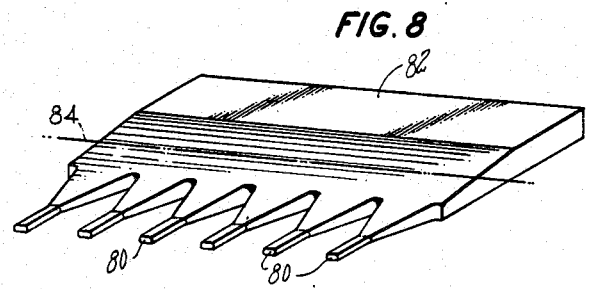
FIG. 8 is an illustrative perspective view of an electrode which may be used to form the coolant passages and slot of the present invention.

The coolant passages and slot of the present invention may be formed by any suitable means. A preferred method is by the well known technique of electro-discharge machining (EDM) using an electrode having the shape of the passages and slot to be formed. A plurality of passages may be simultaneously formed using a "comb" electrode such as shown in FIG. 8, which is simply an electrode comprised of a plurality of adjacent "teeth" 80 each having the shape of a passage 44. The teeth are joined together by a common base 82. The electrode is moved into the workpiece for a distance beyond the length of the teeth 80, such as to the reference line 84 in the drawing. Thus, that portion of the base 82 between the line 84 and the base of the teeth 80 forms the slot 42 in the surface of the workpiece. The base 82 is appropriately tapered in that area to give the proper slot shape.

Although the invention has been shown and described with respect to a preferred embodiment thereof, it should be understood by those skilled in the art that other various changes and omissions in the form and detail of the invention may be made without departing from the spirit and scope thereof.

We claim:

1. A hollow airfoil for a turbomachine, said airfoil being adapted to be disposed in a stream of hot gases flowing in a downstream direction, said airfoil comprising an external wall defining an external pressure surface and external suction surface of said airfoil over which said hot gases flow in said downstream direction, said external wall also having an internal surface defining a portion of a longitudinally extending coolant compartment within said airfoil for receiving cooling air, said external wall including a longitudinally extending slot formed in one of said external surfaces thereof, said slot having a forward wall surface, a rearward wall surface facing said forward wall surface, and a base, said base extending between said rearward and forward surfaces and located within said external wall, said forward and rearward wall surfaces each intersecting said one external surface of said airfoil external wall at a shallow angle for directing cooling fluid downstream over said one external surface and defining a longitudinally extending upstream edge and downstream edge, respectively, of an outlet of said slot, said external wall including a plurality of longitudinally spaced apart cooling air passages, each passage having an inner portion in fluid communication with said coolant compartment for receiving coolant fluid therefrom and for metering the flow of coolant through said passage, said inner portion being immediately followed by an outer portion in series flow relation thereto intersecting said slot base, said outer portion including spaced apart, facing end wall surfaces diverging from each other in the longitudinal direction toward said slot base, adjacent end wall surfaces of adjacent passages substantially meeting each other at said slot base, each passage outer portion also including a pair of spaced apart, facing side wall surfaces parallel to said longitudinal direction and joining said diverging end wall surfaces, wherein, at said slot base, a first of said pair of side wall surfaces joins with said slot forward wall surface, and said other of said pair of side wall surface joins with said slot rearward wall surface.

2. The airfoil according to claim 1 wherein said first side wall surface is coextensive with said slot forward wall surface, and said other side wall surface is coextensive with said slot rearward wall surface.

3. The airfoil according to claim 2 wherein said forward and rearward wall surfaces diverge from each other at an angle of between 5° and 10°.

4. The airfoil according to claim 2 wherein said inner portion includes a straight section having a constant cross-section metering area, said inner portion having a central axis which passes through the geometric center of said metering area and intersects said external surface of said airfoil at an angle of less than 45°.

5. The airfoil according to claim 4 wherein said forward wall surface is parallel to said central axis.

6. The airfoil according to claim 5 wherein each end wall surface diverges from the central axis of its respective passage by an effective angle of at least 10°.

7. The airfoil according to claim 6 wherein said forward and rearward wall surfaces diverge from each other at an angle of between 5° and 10°.

8. The airfoil according to claim 6 wherein said inner portion intersects said internal surface of said airfoil external wall defining an inlet to said passage.

9. The airfoil according to claim 6 wherein said inner portion has an outlet, and said end wall surfaces of said outer portion diverge from said outlet to said slot base.

* * * * *